Aug. 9, 1949.　　　P. DUBILIER ET AL　　　2,478,754
METHOD OF PRODUCING ELECTRICAL CONDENSERS
Filed Nov. 13, 1944　　　　　　　　　　　　　2 Sheets-Sheet 1
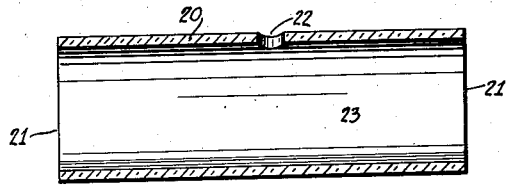
Fig. 1.
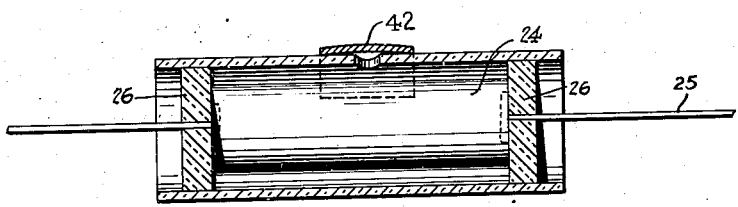
Fig. 2.
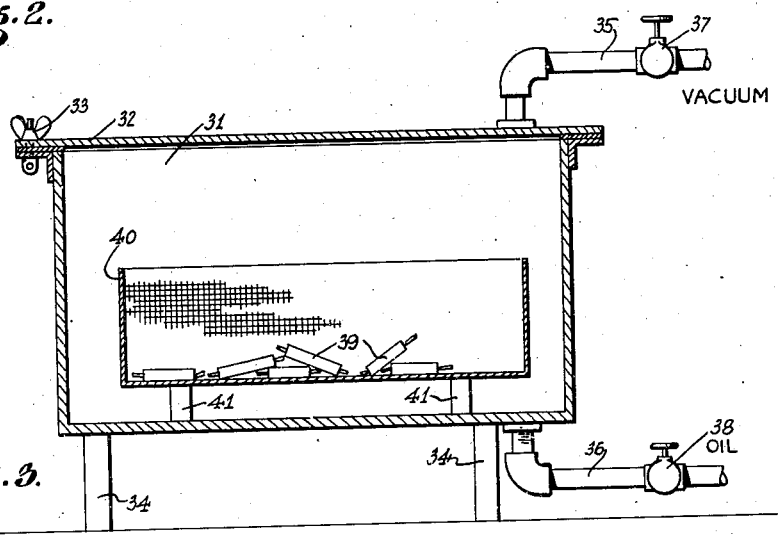
Fig. 3.
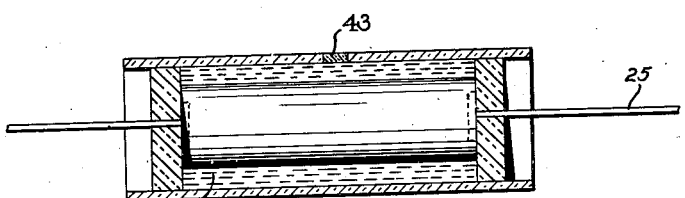
Fig. 4.
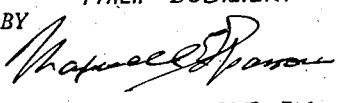
INVENTORS
JACOB KATZMAN.
PHILIP DUBILIER.
BY
ATTORNEY.

Aug. 9, 1949.    P. DUBILIER ET AL    2,478,754
METHOD OF PRODUCING ELECTRICAL CONDENSERS
Filed Nov. 13, 1944    2 Sheets-Sheet 2

INVENTORS.
JACOB KATZMAN.
PHILIP DUBILIER.
BY
ATTORNEY.

Patented Aug. 9, 1949

2,478,754

UNITED STATES PATENT OFFICE 2,478,754

METHOD OF PRODUCING ELECTRICAL CONDENSERS

Philip Dubilier and Jacob Katzman, New York, N. Y.

Application November 13, 1944, Serial No. 563,123

2 Claims. (Cl. 226—1)

This invention relates generally to improvements in electrical devices and more particularly to fixed capacity condensers.

This invention provides for the manufacture of electrical devices, such as condensers and transformers, where the condenser section comprising alternate layers of foil and dielectric or the transformer unit is encased and is uniformly and completely impregnated with a liquid dielectric, such as an insulating oil or wax. The casing or housing may be provided with a small opening and the completed electrical unit is impregnated with the oil or wax through the said opening as more particularly set forth later on.

Heretofore, oil impregnated or oil filled condensers were made with metal containers, and it became particularly difficult to seal the containers or the insulators to the containers so as to avoid leakage of oil. By this invention the condenser is completely sealed, except for the aforesaid small opening, and it has been found comparatively easy to seal this small opening by suitable means.

It is an object of the present invention to provide an oil-impregnated electrical unit.

It is a further object of the present invention to provide an oil or wax encased electrical condenser.

This invention has further reference to the manufacture of paper and foil condenser units where it is the practice to roll the paper and foil into a compact mass or unit, impregnate it with a suitable insulating compound and place the impregnated unit in a suitable tube or other open end container.

It is, therefore, another object of the present invention to efficiently produce in quantity under simple manufacturing conditions a simple, substantially durable condenser of the fixed capacity type, the capacity of which is fairly accurately maintained under substantially normal conditions of use.

Referring to the rolled paper and foil type of condensers, these condensers are made by rolling up two layers of foil with an intermediate layer or layers of paper serving as the dielectric. These rolls of paper and foil after being wound are known as condenser sections.

It is customary to impregnate these condenser sections with different kinds of waxes, depending upon the characteristics required or desired in the completed condenser.

For examples, halowax is used to give high capacity per unit of volume; paraffin wax is used to give better leakage resistance and better moisture proofing. Other insulating waxes, such as, for example, mechanical mixtures of waxes, asphalts, stearine, pitches, petrolatums, oils and resins, are available in a wide range of softening points, degree of hardness, and other desired physical characteristics, the finished compounds embodying high dielectric strength, and moisture, acid, alkali or oil resistance and thus being suitable for impregnating, potting and dip-sealing of electrical condensers. Some electrical condensers are impregnated in oil; mineral oil, for example, being used to produce stable condensers at varying operating temperatures.

The condenser section comprising the rolled paper and foil strips may be immersed in a body of melted impregnating insulating wax which enters between the adjacent foil and dielectric layers and thereover and forms an insulating coating over the entire section to prevent deterioration and subsequent attack by undesirable elements. It is usual to take these wax impregnated sections and to insert them into paper tubes, and to, thereafter, fill the ends of the tubes with a hard wax. However, upon soldering the terminal wires close to the tube, these end sealed waxes would melt, frequently exposing the condenser section to the deteriorating effects of the atmosphere. Again, very often, when these condensers were placed in relatively hot locations, such as those encountered in automobile-receiving sets, the end sealed waxes would melt and ooze out, thus exposing the condenser sections to the elements.

To obviate the above difficulties and disadvantages, according to one phase of the present invention, the ends of the condenser tubes (after the condenser section has been positioned therein) are plugged or sealed with a viscous cement comprising a heat resistant thermosetting condensation product and a mineral filler, such as, for example, comminuted mica, glass or gypsum. The heat-resistant thermosetting condensation product may comprise phenolic or phenol-formaldehyde resin. The urea-formaldehyde resins may also be employed, since urea and formaldehyde, when properly catalyzed, will react to produce thermosetting resins. Also the melamine resins and compounds may be employed, these having a high dielectric strength and being highly heat-resistant, resistant to organic solvents, alkalies and weak acids. Another material which may be employed for the aforesaid purpose is aniline-formaldehyde resin, which has excellent dielectric properties, weather resistance and moisture and chemical resistance.

It is a further object of the present invention to provide an encased condenser which will suffice where extreme resistance to humidity is not required.

A still further object of the present invention is to employ a material or composition for sealing the ends of the casing containing the condenser section, which will not melt upon contact with a hot soldering iron, which will not absorb moisture, which will have good dielectric qualities, offer high resistance and low leakage to electricity and which will not affect the electrical properties of the condenser.

Further objects and advantages of the invention will appear from the following disclosure thereof together with the attached drawing which illustrates a certain form of embodiment thereof.

In the drawing:

Fig. 1 is a sectional view of an open-end casing or tube employable in the invention;

Fig. 2 is a sectional view of a completed condenser unit before impregnation;

Fig. 3 is a sectional view of a tank illustrating condenser units under impregnation treatment;

Fig. 4 is a sectional view of the completed impregnated condenser unit;

Figure 5:
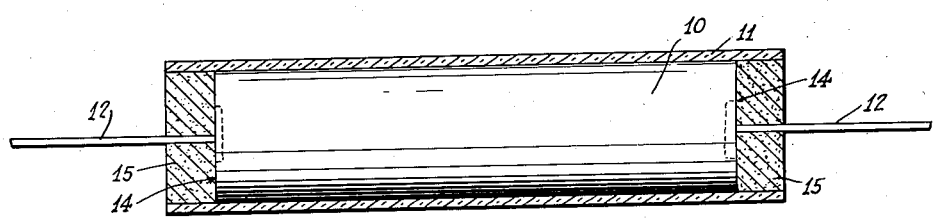
Fig. 5 is a sectional view of a fixed electrical condenser unit or section made in accordance with the invention, encased in a tube, the ends of which are sealed by one form of composition.

Referring to Figs. 1-4 of the drawings, there is disclosed a ceramic or other non-porous body or tube 20 having the open ends 21 and a small opening 22 communicating with the hollow 23 of body 20. Within body 20 there is placed a condenser section 24 having the electrical terminals 25. The ends of the tube 20 are provided with the seals 26 through which the terminals 25 extend.

Seals 26 may comprise a suitable heat-resistant thermosetting composition, such as, for example, a condensation product, and a filler, such as, for example, mica dust or powder, powdered gypsum, or glass powder; or more particularly, a phenolic or phenol-formaldehyde resin and a filler. The filler-resin combination may be partially preformed and then pressed into the ends of the tube.

The sealed ends of the condenser when made in accordance with this invention will not soften or melt under the heat of the soldering iron when the latter is applied to the terminals 25. Where the casing has been treated with varnish, the condenser will be more resistant to moisture and its dielectric qualities will not be affected. It will offer high resistance to the elements and have low electrical leakage.

While the invention is described with respect to a tubular casing having open ends, it is understood that the invention is not limited to such construction, but contemplates the use thereof in any suitable casing enclosing a condenser section, and having an opening to be sealed; and further that the condenser section may comprise a stack of alternate layers and foil and dielectric.

The tube or casing 20 may be made of ceramic material or non-porous plastic composition. The small opening 22 is sealed temporarily as with a strip of suitable adhesive tape or Cellophane, as indicated at 42 in Fig. 2, and the open ends 21 of the tube 20 sealed as hereinabove stated. The closed tube or casing may, if desired, be impregnated with a suitable insulating varnish and/or wax or both, to increase the moisture resistance of the casing.

The temporary seal 42 then prevents the entrance of the moisture-proofing agent into the condenser section 24. The condenser section may thus be completed, by suitably impregnating it with wax or oil, after all of the casing (with the exception of the opening 22) has been moisture proofed and sealed, so that the impregnation of the condenser section will not be impaired by any substantial after-treatment of the unit.

When the casing has been impregnated hole 22 is opened by severing the strip temporarily covering the same, and the completed condenser is impregnated with the insulating oil or wax 30 (Fig. 4) through this opening 22. Impregnation may be accomplished in a vacuum tank 31 having a cover 32 held down by suitable means as the wing nut 33. Tank 31 may be supported on legs 34 and is provided with an air evacuating conduit 35 at the top thereof connecting with a vacuum pump (not shown), and a conduit 36 at its bottom through which the insulating wax or oil may be introduced without disturbing the vacuum. Suitable valves 37, 38 are respectively provided in conduits 35, 36.

If desired, the tank 31 may be heated in any known manner to expel moisture from the condenser sections 24 and casing 20, the air and moisture being drawn out through conduit 35. The condenser units 39 are preferably placed in a perforated basket or other container 40 supported on legs 41 and the impregnating oil or wax will enter the openings 22 and will fill up the voids in the condenser sections 24 as well as the voids in the seal-ended casing 20; and the oil or wax fills the casing providing an oil or wax filled condenser, thus preventing the entrance of moisture or gases.

Opening 22 may be sealed by or with any suitable means, such as, for example, rubber or neoprene cement, or with rubber tape, as indicated at 43 in Fig. 4.

The condenser section (comprising the foils and dielectric layers) may be molded in "Bakelite" or other plastic material, a small hole being formed during the molding operation. This hole provides an opening through which the impregnating material, such as oil or wax, may enter. Thus, the raw condenser section becomes thoroughly impregnated. After the condenser unit is filled with the impregnation material, this opening is sealed as above described.

It may be desired to produce an oil or wax filled condenser in which the condenser section is placed in a preformed casing and the casing covered and the complete condenser unit first impregnated with a suitable insulating varnish and/or wax. A small hole would be provided in the cover or casing through which the oil or wax would be forced and, thereafter, this hole would be sealed.

At the present time when condensers are hot molded in plastic composition, such as, "Bakelite," the heat and pressure forces most of the oil out of the condenser, leaving the condenser substantially dry and thereby reducing the life of the condenser, as well as the operating voltage of the same. By providing a small hole in the mold, the condenser may be impregnated with oil, thus producing a much more efficient condenser.

Figure 6:
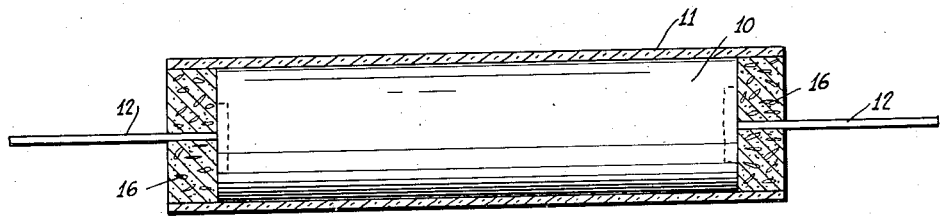
Fig. 6 is a sectional view similar to Fig. 5, the ends of the condenser being sealed with another form of composition.

Referring now to Figs. 5 and 6 of the drawings, the numeral 10 indicates an electrical condenser section which may comprise alternate leaves or layers of metal foil and dielectric, such as, paper rolled or coiled together to form the section.

The condenser section 10 may be impregnated with a suitable insulating material, such as, wax, in the conventional manner and is inserted in a paper, fiber or other desirable tube 11. If desired the whole unit, comprising the tube 11 and condenser unit 10, now may be impregnated with a suitable insulating material to exude any air or moisture which may be trapped and to fill in void spaces between the tube 11 and the condenser section 10.

The electrical terminals 12 are applied to the condenser section 10 in the usual manner.

The cup-shaped or recessed ends 14 are now filled and sealed with a cementitious composition and the ends 14 are baked until the material sets forming the caps or plugs 15 or 16. This cementitious composition 15 comprises a heat resisting thermosetting condensation product and a mineral filler, such as, for example, comminuted mica, glass or gypsum. Any of the aforementioned thermosetting products may be employed. In Fig. 5 the plugs 15 are represented as containing a powdered glass filler, and in Fig. 6, the plugs 16 are represented as containing a powdered mica filler.

The completed unit may be impregnated or coated with a suitable insulating varnish which may be of the synthetic resinous type.

The sealed ends of the condenser when made in accordance with this invention will not soften or melt under the heat of the soldering iron when the latter is applied to the terminals 12, and the end members 15 or 16 of the condenser will not absorb moisture and their dielectric qualities will not be affected. End members 15 or 16 will offer high resistance to the elements and have low electrical leakage. These moisture proof seals on the ends of the condenser adds considerably to the moisture resistance of the entire unit, since most of the moisture absorption to the inside of the condenser must seep through the ends. The metal foil substantially prevents absorption of moisture to the condenser section from the cylindrical wall of the tube.

Although the foregoing is descriptive of the preferred embodiments of the invention, it will be apparent that certain changes may be made in the details, without the exercise of invention or conflicting with the scope of the claims hereto appended.

Having thus described our invention, what we claim as new and desire to secure by Letters Patent is:

1. The method of producing an oil contained electrical device which comprises placing an electrical unit within a housing having an opening, temporarily sealing said opening, treating said housing making the same moisture resistant, removing the temporary seal from said opening, feeding oil through said opening in a vacuum, and permanently sealing said opening.

2. The method of producing an oil or wax contained electrical condenser which comprises placing a condenser section comprising alternate layers of foil and dielectric within a housing having an opening, temporarily sealing said opening; impregnating said housing with a moisture resistant material, removing the temporary seal from said opening, feeding oil or wax through said opening in a vacuum, and permanently sealing said opening.

PHILIP DUBILIER.
JACOB KATZMAN.

REFERENCES CITED

The following references are of record in the file of this patent:

UNITED STATES PATENTS

| Number | Name | Date |
| --- | --- | --- |
| 1,694,927 | Rice et al. | Dec. 11, 1928 |
| 1,890,312 | Caine | Dec. 6, 1932 |
| 1,911,341 | Apple | May 30, 1933 |
| 2,011,555 | Burlingame | Aug. 13, 1935 |
| 2,047,260 | Franklin | July 14, 1936 |
| 2,047,273 | Kopinski | July 14, 1936 |

FOREIGN PATENTS

| Number | Country | Date |
| --- | --- | --- |
| 474,595 | Great Britain | Nov. 3, 1937 |
| 502,039 | Great Britain | Mar. 9, 1939 |
| 508,057 | Great Britain | June 26, 1939 |
| 556,997 | Great Britain | Oct. 29, 1943 |